Jan. 20, 1970 E. G. SEVILLA ET AL 3,491,349

PHASE MODULATION DATA RECOVERY SYSTEM FOR INDICATING WHETHER CONSECUTIVE DATA SIGNALS ARE THE SAME OR DIFFERENT

Filed Oct. 27, 1966 2 Sheets-Sheet 1

United States Patent Office 3,491,349
Patented Jan. 20, 1970

3,491,349

PHASE MODULATION DATA RECOVERY SYSTEM FOR INDICATING WHETHER CONSECUTIVE DATA SIGNALS ARE THE SAME OR DIFFERENT

Ernesto G. Sevilla, Herkimer, N.Y., and William Frederick Simon, Oreland, Pa., assignors to Sperry Rand Corporation, New York, N.Y., a corporation of Delaware Filed Oct. 27, 1966, Ser. No. 590,006
Int. Cl. G11b *5/00*
U.S. Cl. 340—174.1 13 Claims

ABSTRACT OF THE DISCLOSURE

A readout circuit for reading phase modulation signals which generates either of two signals indicative of whether or not two consecutive data bits are the same or different depending on whether the time between readout transients is:

Figure 1:
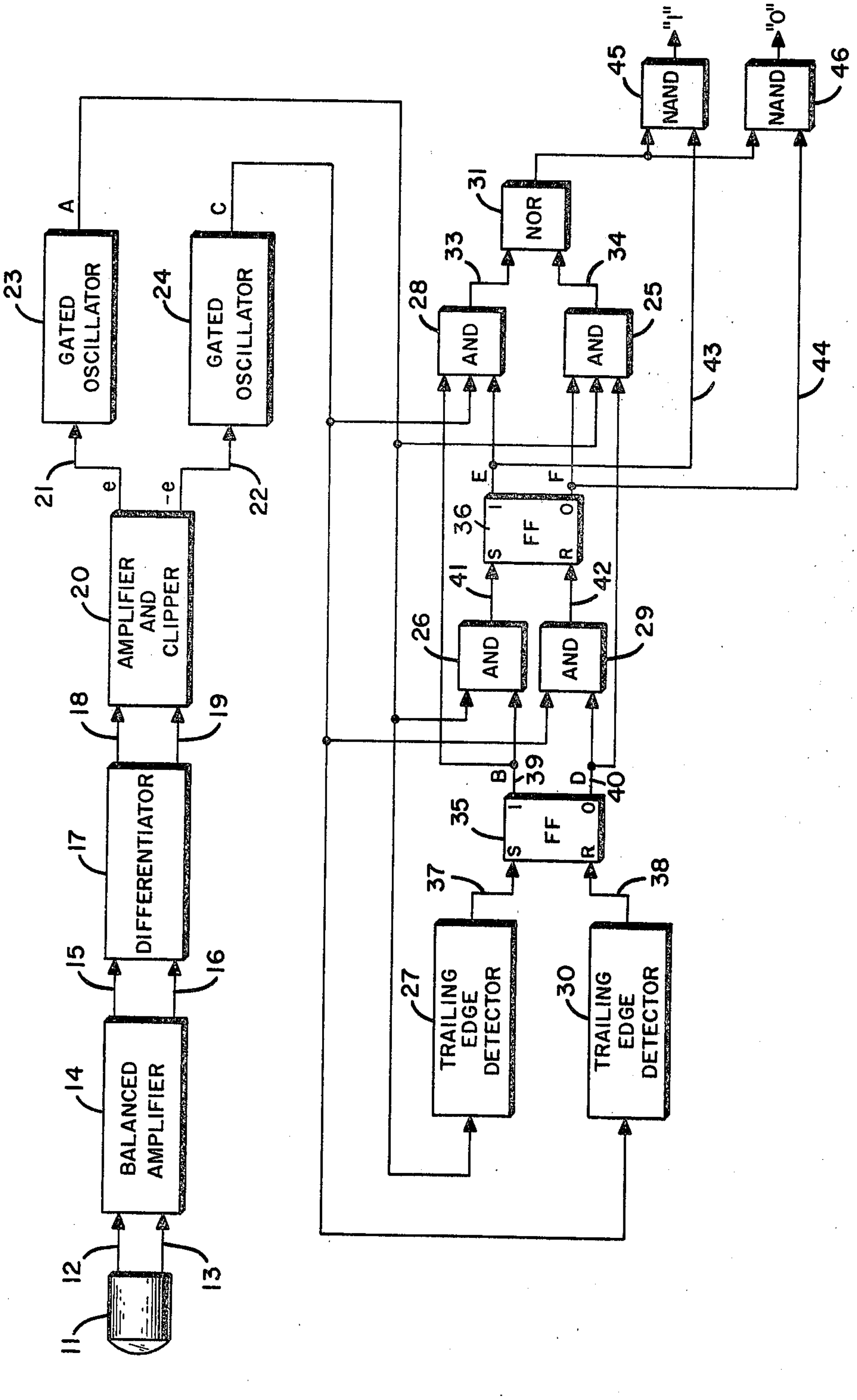

(1) less than three-quarters of a bit period or (2) greater than three quarters and less than one and one quarter bit period.

This invention relates to data reocvery systems and more particularly to a data recovery system for reading out data recorded on a magnetic medium by means of a phase modulation recording method.

In recording systems using the phase modulation recording technique information in the form of binary bits is recorded on the magnetic medium as a result of change in direction of the writing current. For example, a positive change in writing current may result in the recording of a binary "1" while a negative change in writing current results in a binary "0."

Such changes in writing current result in magnetic transitions from one saturated state to the other in the recording medium analogous to the changes in writing current. For example, when a binary "1" is recorded by a change in writing current from a negative current to a positive current, a similar change from negative saturation to positive saturation is made on the recording medium. These changes in magnetic saturation on the recording medium represent the information to be recovered.

When such a recording system i.e., one using phase modulation recording is used, a non-significant change in writing current and therefore in saturation states on the magnetic medium occurs whenever more than one like bits of information are recorded in succession. For example, when two binary "1's" are recorded in succession, a non-significant change in writing current and therefore in saturation states on the medium occurs.

The present invention contemplates a data recovery system for reading out the recorded data while disregarding the non-significant changes in the saturation states on the recorded medium.

Various techniques for the recovery of data recorded utilizing the phase modulated technique have been devised. One common way of detecting such signals is by differentiating, limiting and then detecting zero-crossings or directions of signal changes of the resulting waveform. Usually there is one detector for positive going zero-crossings which may correspond to "0's" and a second detector for negative going zero-crossings which may correspond to "1's." Naturally, zero-crossings corresponding to the non-significant signals are detected and these non-significant signals must be eliminated or inhibited.

In the past such inhibiting means have included arrangements for providing inhibiting signals lasting approximately three-fourths of the bit period initiated by the preceding zero-crossing. The three-quarter period inhibit signals are of sufficient duration to inhibit the non-significant signals developed in the approximate middle of the bit periods. However, since these inhibit signals must persist for such a length of time, i.e., three fourths of a period, recovery system using inhibit signals are adversely affected by such problems as speed variation in the recording medium, noise, circuit jitter, pattern sensitivity and electronic component tolerances. Particularly is this true where the pulse density of recording must be relatively high. Where the pulse density is above, for example two to three thousands bits per inch, the inhibit signal type of recovery system becomes impractical and often useless. The present invention overcomes this disadvantage.

The present invention contemplates a data recovery system for reading out bits of information recorded on a magnetic medium which provides first or second level output signals respectively representative of "1's" or "0's." The signals have durations dependent on the number of successively occurring like bits.

By virtue of the foregoing function, the system of the present invention eliminates the non-significant signals normally associated with phase modulation recording.

Further, the system of the present invention automatically provides sprocket pulses inherently synchronized to the system's timing. The sprocket pulses occur one for each bit period and are used to sample the above mentioned first and second level output signals.

In carrying out the present invention there are provided first and second gated oscillators. Each gated oscillator normally provides a low output as long as it has a high input. However, when the input goes low, the output of the gated oscillator goes high after a predetermined delay or interval, stays high for the predetermined interval and then goes low. This function repeats in a cyclic fashion as long as the gated amplifier remains gated on by a low input. For purposes of clarity the terminology high and low may be thought of as positive and negative.

Each gated oscillator is gated on by a negative pulse initiated by a first recorded magnetic transition and terminated by the next succeeding recorded magnetic transition. The negative pulses which gate the gated oscillator are inversely related, i.e., one is 180° out of phase to the other. Since each gating pulse has a duration dependent on the time between magnetic transition, the gated oscillators when turn on pass one or two pulses dependent on the duration of each gating pulse. By appropriate logic circuitry including a pair of bi-stable elements and four AND gates, the outputs of the gated oscillators are processed to produce first and second level pulses whose levels are indicative of first and second binary bit information and whose durations are indicative the number of like bits read in succession. The outputs from the gated oscillators are further processed to provide sprocket pulses, one during each bit period for sampling the first and second level signals to complete the readout.

Figure 2:
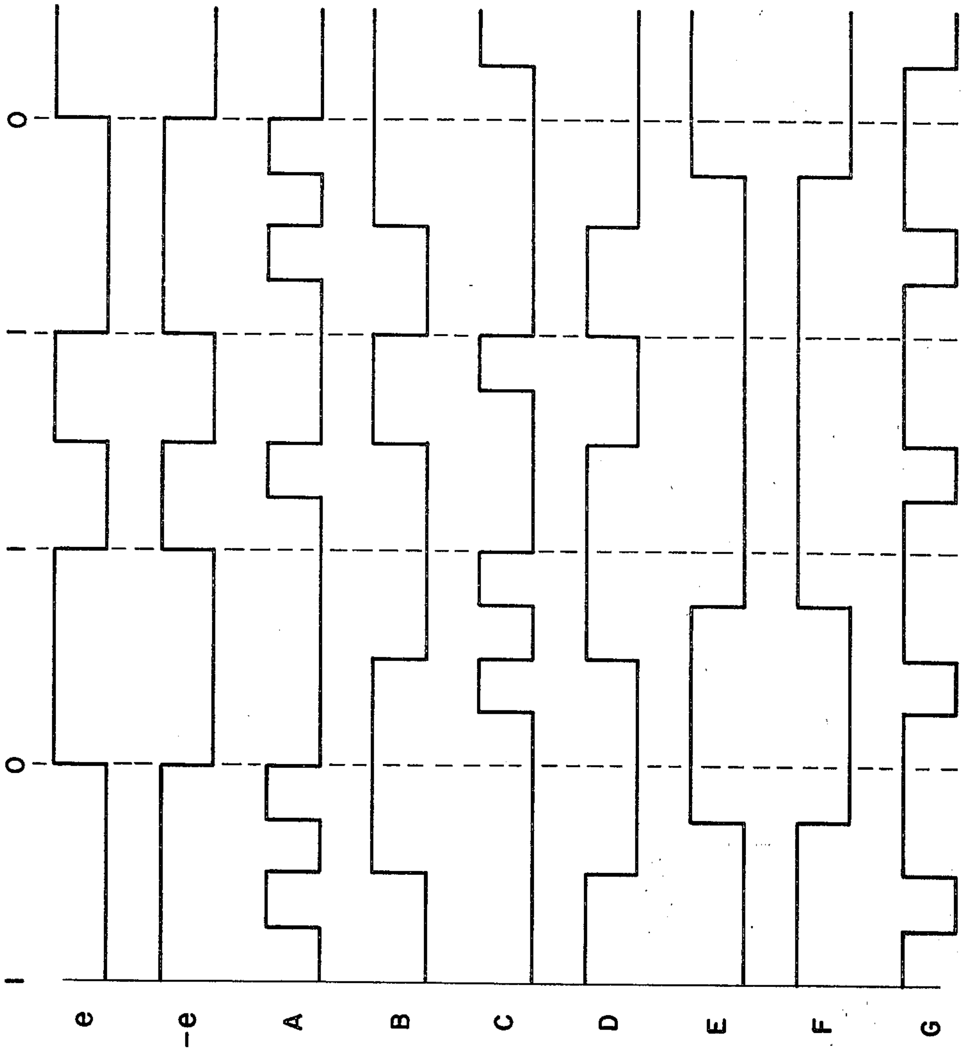

The exact nature of the present invention with all its attendent advantages will become more apparent with the reading of the following description in conjunction with the attached drawings wherein:

FIG. 1 illustrates in block diagram form a preferred embodiment of the present invention, and FIG. 2 shows a series of waveforms representing the outputs at various points in the embodiment of the present invention shown in FIG. 1.

Referring now more particularly to FIG. 1, there is shown a dual output magnetic head 11 having a pair of output conductors 12 and 13. The magnetic head 11 may be of conventional make having a reverse coil such that when it detects a magnetic transition it provides a pulse of one polarity on the conductor 12 and a pulse of opposite polarity on the conductor 13.

The conductors 12 and 13 provide the outputs from the head 11 as inputs to balanced amplifier 14. The balanced amplifier 14 may be a conventional push-pull type of amplifier and functions to amplify and provide a more precise inverse relationship of the pulses from the head 11.

The pulses are then applied to a differentiator 17 which converts the peaks (representative of magnetic transitions) of the voltage pulses provided via conductors 15 and 16, respectively, to voltages at conductors 18 and 19 having zero crossings substantially coincident to the time of occurrence of the peaks.

The conductors 18 and 19 provide the zero crossing voltages as inputs to the amplifier and clipper circuit 20. The amplifier 20 may be a Schmitt trigger circuit responsive to the zero crossing voltages provided by the differentiator 17.

The amplifier 20 provides an output voltage waveform *e*, shown in FIG. 2, on the conductor 21. The output voltage *e* is in the form of voltage pulses which changes from a positive level to a negative level or vice versa in response to each zero crossing applied to amplifier 20. The output on the conductor 22 is a voltage waveform —*e*, shown in FIG. 2, which differs from the voltage waveform *e* only in that it is the inverse of the voltage waveform *e*.

Since the amplifier 20 passes all zero crossing voltages including non-significant zero crossing voltages, the level of voltage *e* and, therefore, voltage —*e* changes with each zero crossing. The purpose of amplifier 14, differentiator 17 and amplifier 20, therefore, is to provide voltages *e* and —*e* which change levels i.e., from a high (positive voltage) to a low (negative voltage) in response to change of magnetization from one saturation state to the other saturation state as detected in a magnetic recording medium. When a recorded bit is followed by an unlike bit, the time voltage during which *e* remains at one level is substantially equal to a bit period. When however, a recorded bit is followed by a like bit, the voltage *e* changes level twice within a bit period.

Of course, other methods and structures might be used for producing the voltages *e* and —*e* than that shown. The essential thing is to provide voltages *e* and —*e* having the characteristics discussed above.

Voltages *e* and —*e* are provided as inputs to gated oscillators 23 and 24, respectively, via the conductors 21 and 22. The gated oscillators 23 and 24 are of a type whose output is low as long as the input is high. However, when the input goes low, the output goes high after a predetermined delay or interval. The output stays high for the predetermined interval and then goes low. This cycle repeats until the input goes high again. This kind of gated oscillator is well known and may be similar to the type disclosed in IBM Technical Disclosure Bulletin, January 1966, vol. 8, No. 8, page 1160.

The gated oscillators 23 and 24 of the present invention are chosen to have a natural period approximately equal to one-half the average bit period. The number of pulses generated by such an oscillator depends upon the length of time during which it is gated on. In the present case, since the natural period of oscillation is chosen to be one-half the average bit period, one pulse will be generated by the gated oscillator if the time during which the oscillator is gated on is less than three-quarters of the average bit period. On the other hand if the time during which the gated oscillator is gated on is greater than three-quarters but less than one and one-quarter of the average bit period two pulses will be generated.

Considering the gated oscillator 23, it may be seen by referring to waveforms *e* and A that the first negative or low level pulse of voltage *e* is of sufficient duration to cause the gated oscillator 23 to provide two output pulses. The next low level or negative pulse of voltage *e* has sufficient duration to cause the gated oscillator 23 to provide only one output pulse. As will become more apparent hereinbelow, the occurrence of two output pulses from the gated oscillator 23 is indicative that a recorded bit of information on the recorded medium is not followed by a like bit while the occurrence of a single pulse at the output of the gated oscillator indicates that a bit of recorded information is being successively followed by a like bit. The gated oscillator 24 operates in the same manner. For example, referring to waveform —*e* and C in FIGURE 2, it may be seen when two unlike bits are being detected, the waveform —*e* remains at a low level or negative value long enough for the gated oscillator 24 to generate two output pulses. When two like pulses occur in succession, the gated oscillator 24 will produce only one output pulse. The outputs from the gated oscillators 23 and 24 are represented by the waveforms A and C as shown in FIGURE 2.

The output of the gated oscillator 23 is connected by appropriate conductor means as an input to AND circuit 25, AND circuit 26, and trailing edge detector 27. The output of the gated oscillator 24 is connected by appropriate conductor means as an input to AND gate 28, AND gate 29, and trailing edge detector 30. The AND circuits 25 and 28 each require three simultaneous inputs to produce an output. The outputs of the AND gates 25 and 28 are connected as inputs to the NOR circuit 31. The NOR circuit 31 may be of any conventional type which normally provides a high output which goes low during application of a high input at either one of its two input conductors 33 and 34.

The trailing edge detectors 27 and 30 provide output pulses in response to and substantially at the same time as the occurrence of the trailing edge of the first occurring pulse from the gated oscillators 23 and 24, respectively, of when the gated oscillators 23 and 24 are in the gated on state. Thus, each trailing edge detector 27 and 30 provides an output pulse during each period of oscillation of the gated oscillators 23 and 24 in response to the trailing edge of the first pulse occurring during their respective periods of oscillation.

The output of the trailing edge detector 27 is connected to the set input terminal of flip-flop 35 via conductor 37. The trailing edge detector 30 has its output connected to the reset terminal of the flip-flop 35 via conductor 38. The flip-flop 35 is a conventional electronic bistable element which will be set by a pulse appearing on the conductor 37 when its initial state is in the reset condition and which will be reset by a pulse appearing on the conductor 38 when it is in the set condition. When set by pulse from the trailing edge detector 27, the flip-flop 35 provides an output or a high on the output conductor 39. Similarly, a pulse from the trailing edge detector 30 causes the flip-flop 35 to change state and have an output or a high on the output conductor 40. Naturally, when the flip-flop 35 is in the set condition, it will be unaffected by a pulse from the trailing edge detector 27 and when it is in the reset condition it will be unaffected by pulse from the trailing edge detector 39. The pulses appearing on the conductors 30 and 40 are represented by the waveforms B and D shown in FIGURE 2.

The conductor 39 is connected as an input conductor to the AND gates 26 and 28. The conductor 40 is connected as an input conductor to the AND gates 25 and 29. Thus, it may be seen at this point that the AND gate 26 has an output whenever the waveforms B and A shown in FIGURE 2 go high simultaneously while the AND gate 29 has an output whenever the pulses represented by waveforms D and C go high simultaneously. The pulses referred to here are the positive or high portions of the waveforms.

A flip-flop 36 similar to the flip-flop 35 has its input set terminal connected to the output terminal of the AND gate 26 via conductor 41. The flip-flop 36 has its input reset terminal connected to the output terminal of the AND gate 29 via conductor 42. Thus, an output from the AND gate 26 will cause the flip-flop 36 to be set and provide an output or a high signal on the conductor 43. Similarly, an output from the AND gate 29 causes the flip-flop 36 to be reset to provide an output or high signal on the output conductor 44. The output signals that appear on the output conductors 43 and 44 are respectively represented by the waveforms E and F shown in FIGURE 2. The conductors 43 and 44 are connected to provide inputs to the AND gates 25 and 28 respectively. Thus, when high signals represented by the waveforms A, D and F occur simultaneously, the AND gate 25 will provide an output on the conductor 34. When high signals represented by the waveforms B, C, and E occur simultaneously, the AND gate 28 will provide an output signal on the conductor 34.

The NOR circuit 31 normally has a high output. When it receives an input from the AND gate 25 or the AND gate 28, its output goes low for the duration of its input pulse. The output of NOR circuit 31, therefore, is a series of inverted sprocket pulses as shown in waveform G. Each sprocket pulse occurs within a bit period. A sprocket pulse occurs every bit period. Only one sprocket pulse occurs during a bit period. A study of the timed conditions under which a sprocket pulse is produced makes the foregoing clear. Therefore, the sprocket pulses are inherently synchronized with the system's timing and are used as an internal means for sampling the waveforms E and F provided on the output conductors 43 and 44, respectively.

The waveform E has two levels, a high and a low which for reference purposes may be thought of as a positive voltage and a negative voltage. When the voltage waveform E is low, it means at least one binary "1" is being read from the recorded medium. If only one sprocket pulse occurs while the voltage is low, it means the binary "1" has not been followed by another binary "1" on the recorded medium. However, if two or more sprocket pulses can occur during the time the voltage is low, two or more bits have occurred in succession on the recorded medium. If the outputs from NOR circuit 31 and the conductor 43 are fed to NAND gate 45, NAND gate 45 will have a distinct high output for every sprocket pulse that occurs during a low voltage on the conductor 43.

Likewise, when voltage waveform F is low, such is indicative that at least one binary "1" is being read. The sprocket pulses from the NOR circuit 31 and voltage waveform F may be applied to NAND gate 46 which provides a distinct high output for each sprocket pulse that occurs while voltage waveform F is low.

If the output from the NAND gate 45 is inverted and combined with the output from the NAND gate 46 on a single output line, the resulting series of pulses represents the read out information from the recorded medium.

No attempt has been made in the foregoing description to rigorously refer to polarities of the pulses at various points throughout the system. This has been done to avoid unnecessary confusion and also because the sense of the magnetic transitions may be arbitrarily chosen to represent a binary "1" or a binary "0." After such choice consistency is inherently obeserved by the system, a little care must be taken to determine whether the high (or low) signals on conductors 43 and 44 are to represent binary "1's" or "0's."

While the invention has been described as providing means for eliminating the non-significant pulses with two successively recorded like bits, it should be obvious the present system will eliminate non-significant pulses when more than two like bits have been recorded in succession.

The embodiments of the invention in which an exclusive property or privilege is claimed are defined as follows:

1. In a system for reading out data where the data is recorded in binary form on a magnetic medium in the form of magnetic transitions from one saturated state to another wherein the sense of the magnetic transition is indicative of a binary "1" or a binary "0", first means responsive to said magnetic transitions to generate a voltage waveform having positive and negative pulses whose durations are equal to the time between said magnetic transitions, first gated oscillator means connected to said first means and responsive to each negative pulse therefrom to provide one or two output pulses dependent on the duration of said each negative pulse, second means connected to said first gated oscillator means providing an output pulse only in response to a second occurring pulse from said first gated oscillator means during a gated interval, third means connected to said second means terminating said output pulse therefrom only when the next succeeding magnetic transition occurs more than three quarters of a bit period after said magnetic transition which initiated said each negative pulse from said first means.

2. In a system according to claim 1 wherein said third means comprises, fourth means providing a voltage waveform 180° out of phase with the waveform provided by said first means, second gated oscillator means connected to said fourth means and responsive to each negative pulse there from to provide one or two output pulses dependent on the duration of said each negative pulse from said fourth means, fifth means connected between said second gated oscillator means and said second means terminating said output pulse from said second means only in response to a second occurring pulse from said second gated oscillator means during a gated interval.

3. In a system according to claim 2 wherein said first and second gated oscillator means provide a single output pulse if their respective gated on periods are less than three quarters of a bit period and provide two output signals if their respective gated on periods are more than three quarters of a bit period.

4. In a system according to claim 2 wherein said system further comprises sixth means connected to said first and second gated oscillator means providing an output pulse during each bit period.

5. In a system according to claim 4 wherein said system further comprises seventh means connected to said second means and said sixth means for determining the number of pulses from said sixth means which occur during said output pulse from said second means.

6. In combination with a record medium in which phase modulated signals including bits of information are recorded with one bit being recorded each bit period, a read out circuit for said phase modulation signals comprising an oscillator normally in an inoperative state, means for applying said phase modulated signals to said oscillator to enable said oscillator to generate one pulse signal when the time between sequential transients is less than three quarters of a digit period and to generate two signals when the time between sequential transients is greater than three quarters and less than one and one quarter digit period, the presence of one pulse signal indicating that two consecutive bits of information are the same and the presence of two pulse signals indicating that two consecutive bits of information are different.

7. In a read out circuit for reading out bits of information recorded on a record medium in the form of magnetic transitions between saturated states, first and second gated oscillators, each of said first and second gated oscillators being responsive to negative pulses to provide one or two output pulses dependent on the duration of said negative pulses, a first flip-flop, first means connected between said first gated oscillator and said first flip-flop for setting said first flip-flop in response to the trailing edge of the first occurring pulse from said gated oscillator, second means connected between said second gated oscillator and said first flip-flop for resetting said first flip-flop in response to the trailing edge of the first occurring pulse from said second gated oscillator, a second flip-flop, third means connecting said first gated oscillator and the set output terminal of said first flip-flop to said second flip-flop for setting said second flip-flop when said first gated oscillator and the set output terminal of said first flip-flop have coincident outputs, fourth means connecting said second gated oscillator and the reset output terminal of said first flip-flop to said second flip-flop for resetting said second flip-flop when said second gated oscillator and the reset output terminal of said first flip-flop have coincident outputs.

8. In a read out circuit according to claim 7 wherein said read out circuit further includes, first input means connected to said first gated oscillator responsive to said magnetic transitions to generate a voltage waveform having positive and negative pulses whose durations are equal to the time between said magnetic transitions, second input means connected to said second gated oscillator providing a voltage waveform to said gated oscillator which is 180° out of phase with said voltage waveform provided by said first input means.

9. In a read out circuit according to claim 8 wherein said first and second gated oscillators provide a single output pulse if their respective gated on periods are less than three quarters of a bit period and provide two output pulses if their respective gated on periods are more than three quarters of a bit period.

10. In a read out circuit according to claim 7 said read out circuit further including fifth means connected to said first gated oscillator, the reset output terminal of said first flip-flop and the reset output terminal of said second flip-flop providing an output pulse when said first gated oscillator and the reset output terminals of said first and second flip-flops have coincident outputs, sixth means connected to said second gated oscillator, the set output terminal of said first flip-flop and the set output terminal of said second flip-flop providing an output pulse when said second gated oscillator and the set output terminals of said first and second flip-flops have coincident outputs.

11. In a read out circuit according to claim 10 wherein said read out circuit further includes, first input means connected to said first gated oscillator responsive to said magnetic transitions to generate a voltage waveform having positive and negative pulses whose durations are equal to the time between said magnetic transitions, second input means connected to said second gated oscillator providing a voltage waveform to said second gated oscillator which is 180° out of phase with said voltage waveform provided by said first input means.

12. In a read out circuit according to claim 11 wherein said first and second gated oscillators provide a single output pulse if their respective gated on periods are less than three quarters of a bit period and provide two output pulses if their respective gated on periods are more than three quarters of a bit period.

13. In a read out circuit according to claim 10 wherein said read out circuit further comprises, seventh means connected to said fifth means and the reset output terminal of said second flip-flop gating the pulses from said fifth means while said second flip-flop is in a reset condition, eighth means connected to said sixth means and the set output terminal of said second flip-flop gating the pulses from said sixth means while said second flip-flop is in a set condition.

References Cited

UNITED STATES PATENTS 2,700,155 1/1955 Clayden ---------- 340—174.1
3,243,580 3/1966 Welsh ------------ 340—174.1

BERNARD KONICK, Primary Examiner

WILLIAM F. WHITE, Assistant Examiner